United States Patent
Ziegler

(10) Patent No.: US 7,912,993 B2
(45) Date of Patent: Mar. 22, 2011

(54) METHODS AND MEDIA FOR MANAGING INTERRUPTION OF THE OUT OF BOX EXPERIENCE

(75) Inventor: Jeremy R. Ziegler, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 338 days.

(21) Appl. No.: 12/164,098

(22) Filed: Jun. 29, 2008

(65) Prior Publication Data

US 2009/0327551 A1 Dec. 31, 2009

(51) Int. Cl.
*G06F 3/00* (2006.01)
*G06F 13/24* (2006.01)

(52) U.S. Cl. .......................................... 710/10; 710/268

(58) Field of Classification Search ............... 710/10, 710/266, 267, 269
See application file for complete search history.

(56) References Cited

U.S. PATENT DOCUMENTS

| | | | | |
|---|---|---|---|---|
| 6,272,626 | B1 * | 8/2001 | Cobbett | 713/2 |
| 6,298,443 | B1 * | 10/2001 | Colligan et al. | 726/29 |
| 6,505,298 | B1 * | 1/2003 | Cerbini et al. | 713/1 |
| 6,560,726 | B1 * | 5/2003 | Vrhel et al. | 714/55 |
| 6,606,716 | B1 * | 8/2003 | Vrhel et al. | 714/32 |
| 6,640,316 | B1 * | 10/2003 | Martin et al. | 714/36 |
| 6,857,011 | B2 | 2/2005 | Reinke | |
| 6,892,297 | B1 * | 5/2005 | Aguilar et al. | 713/2 |
| 6,983,337 | B2 * | 1/2006 | Diamant | 710/48 |
| 2003/0115091 | A1 * | 6/2003 | Sawyer | 705/10 |
| 2004/0034764 | A1 * | 2/2004 | Bulusu et al. | 713/1 |
| 2004/0123284 | A1 * | 6/2004 | Bryant et al. | 717/174 |
| 2006/0075261 | A1 * | 4/2006 | Dandekar et al. | 713/191 |
| 2006/0294350 | A1 * | 12/2006 | Yang et al. | 713/1 |
| 2009/0172471 | A1 * | 7/2009 | Zimmer et al. | 714/17 |

FOREIGN PATENT DOCUMENTS

EP 1 185 409 A1 5/2008

* cited by examiner

*Primary Examiner* — Khanh Dang
(74) *Attorney, Agent, or Firm* — Garrana Tran LLP; Andrea E. Tran

(57) ABSTRACT

A method for managing interruption of an out of box experience for an information handling system (IHS) whereby the method includes writing a flag to storage device, wherein the storage device is coupled to a processor within the IHS and executing an interruption handling sequence at the processor within the IHS, wherein the processor is operable to read the flag in the storage device as an input to the interruption handling sequence.

16 Claims, 2 Drawing Sheets

METHODS AND MEDIA FOR MANAGING INTERRUPTION OF THE OUT OF BOX EXPERIENCE

BACKGROUND

1. Technical Field

The present disclosure relates generally to the field of information handling systems, and more specifically, to methods for managing interruption of the out of box experience for build to order systems.

2. Background Information

As the value and use of information continues to increase, individuals and businesses seek additional ways to process and store information. One option available to users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An out of box experience, also known as Windows Welcome specifically in the case of Windows Operating System (OS) may execute during the first run of an information handling system (IHS). Following the purchase of a build to order IHS, the out of box experience executes prior to the initiation of Windows shell or any additional software. Specifically, the out of box experience performs a set of tasks and offers necessary to configure and run Windows including offering to end users antivirus, antiphishing, antispyware, and firewall software, offering to end users an opportunity to register for internet service provider (ISP) service, enabling end users to select a default browser, requesting user registration information and offering end users an opportunity to opt-in to hardware-related updates.

With emerging operating systems (OS) such as Microsoft Vista, the out of box experience may experience corruption or interruption, particularly during the powering off of an IHS, which may in turn result in the non-application of customizations selected by end users. End users who encounter these challenges may require additional technical support, thus diminishing the customer experience and increasing costs for manufacturers of IHSs.

Thus, a need exists for methods to inform and instruct a user on how to respond to an interruption to the out of box experience.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the disclosure provides a method for managing interruption of an out of box experience for an information handling system (IHS) whereby the method includes writing a flag to a storage device, wherein the storage device is coupled to a processor within the IHS and executing an interruption handling sequence at the processor, wherein the processor is operable to read the flag in the storage device as an input to the interruption handling sequence.

Another aspect of the disclosure provides a method for responding to interruption of an out of box experience for an information handling system (IHS), whereby the method includes executing an interruption handling sequence at a processor within the IHS, wherein the processor is operable to read a flag written to storage device as an input to the interruption handling sequence and prompting a user to execute a re-image of the IHS in response to the flag.

Yet another aspect of the disclosure provides a computer-readable medium having computer-executable instructions for performing a method for managing interruption of an out of box experience for an information handling system (IHS) whereby the method includes writing a flag to storage device, wherein the storage device is coupled to a processor within the IHS and executing an interruption handling sequence at the processor, wherein the processor is operable to read the flag in the storage device as an input to the interruption handling sequence.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Before the present methods and apparatus are described, it is to be understood that this disclosure is not limited to the particular methods and apparatus described, as such may vary. One of ordinary skill in the art should understand that the terminology used herein is for the purpose of describing possible aspects, embodiments and/or implementations only, and is not intended to limit the scope of the present disclosure which will be limited only by the appended claims.

It must also be noted that as used herein and in the appended claims, the singular forms "a," "and," and "the" may include plural referents unless the context clearly dictates otherwise. Thus, for example, reference to "a component" refers to one or multiple components, and reference to "a method of processing" includes reference to equivalent steps and methods known to those skilled in the art, and so forth.

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

Figure 1:
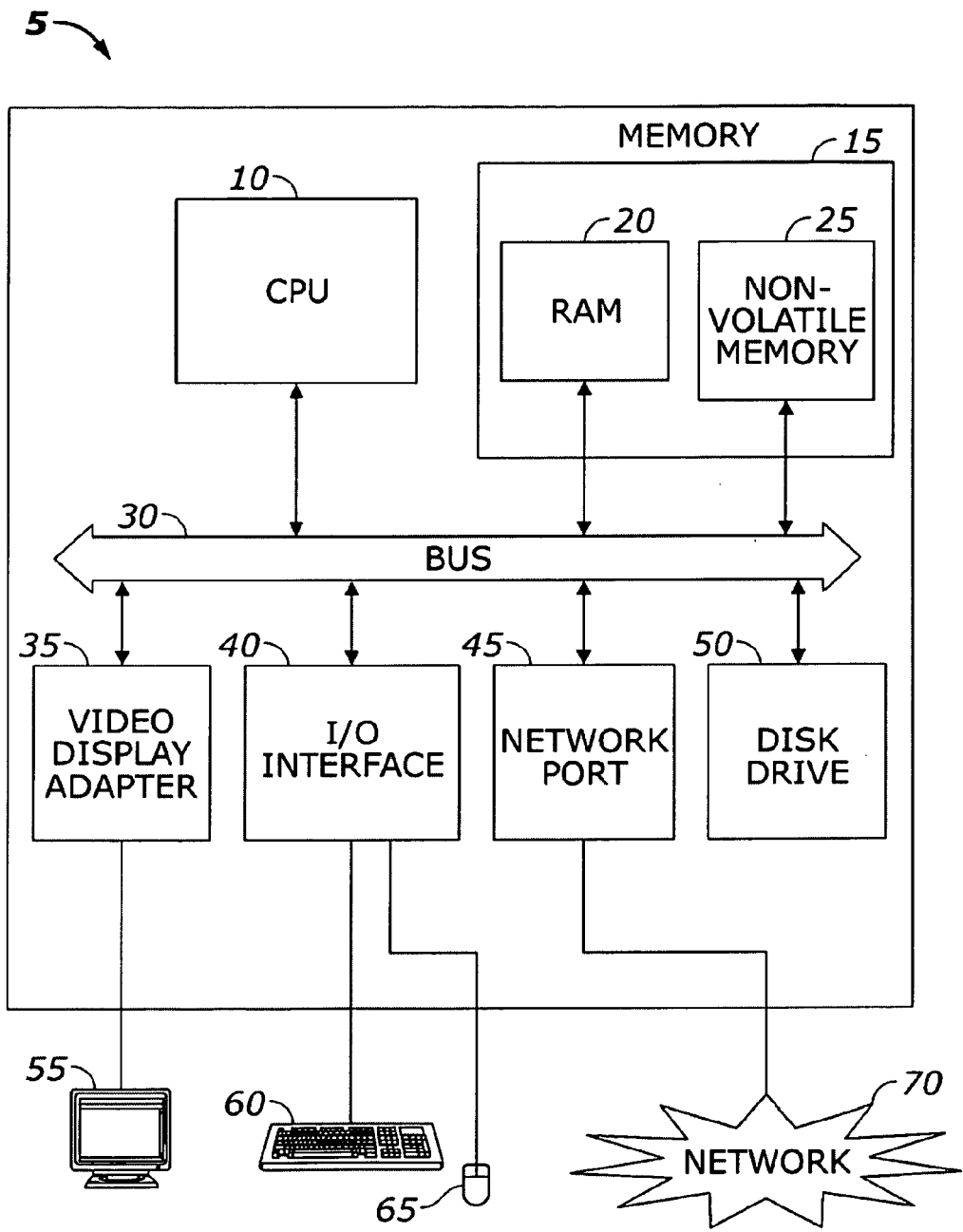
FIG. 1 represents an illustrative schematic of an information handling system (IHS) in accordance with an implementation of the present disclosure.

FIG. 1 illustrates one possible implementation of an IHS 5 comprising a CPU 10. It should be understood that the present disclosure has applicability to IHSs as broadly described above, and is not intended to be limited to the IHS 5 as specifically described. The CPU 10 or controller may comprise a processor, a microprocessor, minicomputer, or any other suitable device, including combinations and/or a plurality thereof, for executing programmed instructions. It is appreciated that execution of the algorithm to be described below occurs in the processor or the CPU 10. The CPU 10 may be in data communication over a local interface bus 30 with components including memory 15 and input/output interfaces 40. The memory 15, as illustrated, may include non-volatile memory 25. The non-volatile memory 25 may include, but is not limited to, flash memory, non-volatile random access memory (NVRAM), and electrically erasable programmable read-only memory (EEPROM). The non-volatile memory 25 may contain a firmware program (not shown) which may contain programming and/or executable instructions required to control a keyboard 60, mouse 65, video display 55 and/or other input/output devices not shown here. This type of firmware may be known as a basic input/output system (BIOS). The memory may also comprise random access memory (RAM) 20. The operating system and application programs (e.g., graphical user interfaces) may be loaded into the RAM 20 for execution.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

Figure 2:
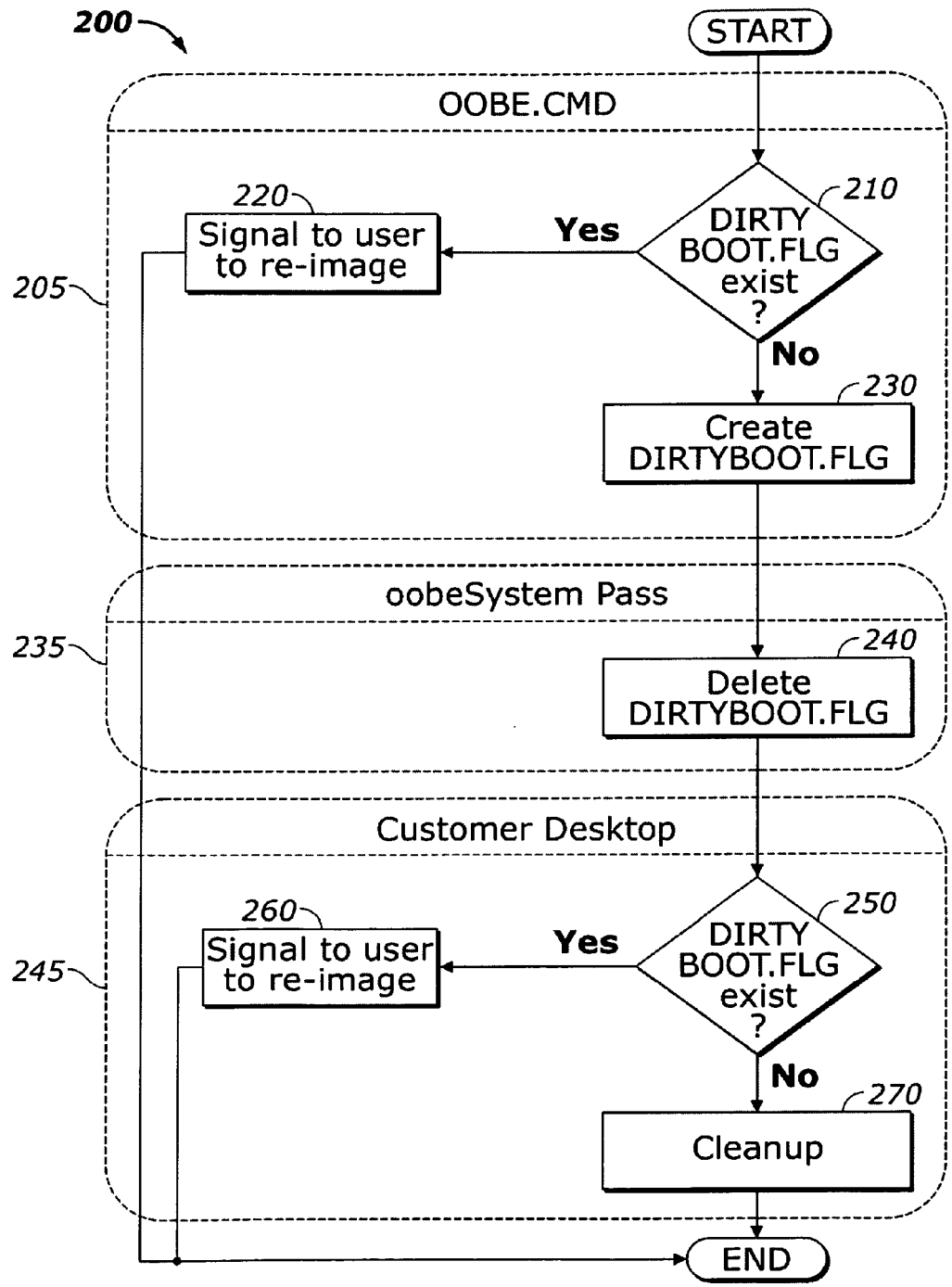
FIG. 2 represents an illustrative flowchart for an interruption handling sequence for an out of box experience in accordance with an implementation of the present disclosure.

Referring now to FIG. 2, an illustrative method for an interruption handling sequence for an out of box experience is indicated generally at 200. To set-up an IHS, a user may physically remove the IHS from packaging, connect the physical components and then initiate start-up procedures. As part of a start-up procedure, the out of box experience or OOBE may refer to the process of establishing an IHS or software program into an operational state. Prior to the initiation of the out of box experience whereby a user may enter information and customizations, the IHS may execute an interruption handling sequence 200 during which a pre-OOBE command (e.g., OOBE.cmd) is processed during a pre-OOBE module 205. In one possible implementation, a pre-OOBE command may be an ordinary command (CMD) file that is processed (e.g., via a processor) per line by an operating system (OS) shell prior to executing OOBE. Any suitable OS may be contemplated by the present disclosure including Microsoft Windows (e.g., Windows XP, Windows Vista and Win7) and the like.

In step 210, a pre-OOBE command may determine the existence of a dirty boot setting such as a flag (e.g., DIRTYBOOT.FLG) associated with an interruption to the execution of the out of box experience. In one implementation, upon initial boot up of the IHS, its default state may include the dirty boot setting.

If in step 210 it is determined that such a flag exists, the end user may be prompted to execute a replacement of the current image of the IHS in step 220. As used herein, "image" may refer to a backup or a copy of data stored in any storage device such as a hard drive or the like. The end user may opt to re-image the system utilizing an in-box product to replace the IHS's current image with an image of the hard drive captured prior to shipping the IHS to the end user. The IHS may also provide a utility to restore (i.e., Dell system restore or DSR) the system to factory settings. Thus, a re-imaging of the IHS may allow an end user to re-initiate the out of box experience without interruption.

If in step 210 it is determined that a flag indicating an interruption to the OS or the out of box experience does not exist, the flag is then created by the pre-OOBE command in step 230. A dirty book setting or flag may be written to a storage device such as a hard disk drive, NVRAM or the like. In one possible implementation, the creation of the flag may occur prior to an end user entering the out of box experience. Further, it is understood that steps 210 through 230 of method 200 may occur during a pre-OOBE module 205.

In the event that the out of box experience executes as designed without interruption, the flag may be removed in step 240. However, if the out of box experience is interrupted for any particular reason then the flag is not removed in step 240. An interruption to the execution of the out of box experience may be caused by any unanticipated event such as powering off the IHS or the like. By determining the existence of the flag, the IHS may detect if the out of box experience was not terminated in an expected fashion, particularly in the event that the flag exists.

The check for the flag may further detect power cycles prior to the failure of the out of box experience or the operating system (OS). A power cycle may constitute an unexpected interruption of the out of box experience that would cause the flag to remain. As shown in FIG. 2, DIRTYBOOT.FLG may exist as the flag indicating an interruption to the OS or the out of box experience, however it is understood that any suitable flag may be applicable.

The out of box experience may then be initiated during or prior to an OOBE module 235 (e.g., OOBESystem Pass) during which a series of customizations and offers are performed to configure and execute an operating system (e.g., Microsoft Windows). Examples of customizations that may be executed as part of the out of box experience include, but are not limited to, selection of antivirus, antiphishing, antispyware, and firewall software, registration for an internet service provider (ISP), selection of a default browser, selection of country and keyboard by an end user, requesting user registration information and offering end users an opportunity to opt-in to hardware-related updates. The OOBE module may allow the execution of commands to be run at an end user site since some customizations may require information from end users.

The method for an interruption handling sequence 200 of FIG. 2 resumes with the completion of the out of box experience whereby an end user may select "finish" on a dialog box. Upon selection of "finish" or any suitable option to complete the out of box experience, step 240 may occur as the dirty boot setting (e.g., flag) associated with an interruption to the out of box experience is deleted. The deletion of the flag may ensure that the OOBE module 235 is executed and that customizations selected by an end user are applied. Deletion of the flag may occur by any conventional operating system deletion process. With respect to this disclosure, deletion of the flag may occur at a point whereby the IHS has essentially completed the out of box experience and thus, the likelihood of further interruption of OOBE is low.

An IHS may then perform post-out of box experience set-up functions during a post-OOBE module 245 (e.g., via a desktop). Examples of post-out of box experience functions may include setting the users power scheme, initiating the countdown on timed software demos, activating the installed anti-virus software and the like.

An IHS may present the operating system desktop whenever an end user selects an option to complete the out of box experience. In step 250, it is determined whether a flag indicating an interruption to the OS or the out of box experience (e.g., DIRTYBOOT.FLG) exists. Step 250 may serve as a final check of the interruption handling sequence 200. If the flag exists, the out of box experience may have been interrupted by, for example, powering off the IHS during the execution of the out of box experience. In the event that the flag exists in step 250, an end user may be prompted to replace the current image of the IHS, similar to step 220 discussed above. If the flag is found to exist in step 250, OOBE module 235 and/or step 240 may not have executed. Thus, user selected customizations may not have been applied. Prompting an end user to re-image the IHS should prevent the user from executing any command or program in an untested state as well as ensure that no effect of an interrupted out of box experience (e.g., non-application of a user customization) is present.

If in step 250 it is determined that a flag does not exist, a cleanup is then executed in step 270. During the cleanup in step 270, files which have been created to determine the existence of the flag (e.g., DIRTYBOOT.FLG) in steps 210 and 250 are removed. The removal of the files may ensure that checks for the existence of the flag are no longer performed on subsequent boots.

Various methods are contemplated including all or less than all of the steps described herein and/or mentioned above, any number of repeats or any of the steps shown and/or mentioned above, and performance of the steps in any order.

Generally, methods of the present disclosure, detailed description and claims may be presented in terms of logic, software or software implemented aspects (e.g., modules) typically encoded on a variety of media or medium including, but not limited to, computer-readable medium/media (e.g., disk drive), machine-readable medium/media, program storage medium/media or computer program product. Such media may be handled, read, sensed and/or interpreted by an IHS. Those skilled in the art will appreciate that such media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

Although the present disclosure has been described with reference to particular examples, embodiments and/or implementations, those skilled in the art will recognize that modifications and variations may be made without departing from the spirit and scope of the claimed subject matter. Such changes in form and detail, including use of equivalent functional and/or structural substitutes for elements described herein, fall within the scope of the appended claims and are intended to be covered by this disclosure.

What is claimed is:

1. A method for managing interruption of an out of box experience for an information handling system (IHS), the method comprising:
    determining whether a flag associated with an interruption to the out of box experience is written to a storage device, wherein the storage device is coupled to a processor within the IHS;
    executing an interruption handling sequence at the processor within the IHS, wherein the processor is operable to read the flag in the storage device as an input to the interruption handling sequence; and
    executing a replacement of an image of the IHS in response to the flag.

2. The method of claim 1, wherein the interruption handling sequence comprises deleting the flag.

3. The method of claim 1 further comprising removing files associated with the interruption handling sequence.

4. The method of claim 1, wherein the out of box experience occurs during an initial execution of an operating system.

5. The method of claim 4, wherein the operating system is selected from Windows Vista, Windows XP and Win7.

6. A method for responding to interruption of an out of box experience for an information handling system (IHS), the method comprising:
    executing an interruption handling sequence at a processor within the IHS, wherein the processor is operable to read a flag written to a storage device as an input to the interruption handling sequence, the flag associated with an interruption to the out of box experience; and
    prompting a user to execute a re-image of the IHS in response to the flag.

7. The method of claim 6, wherein the flag corresponds to the interruption of the out of box experience.

8. The method of claim 6, wherein the interruption handling sequence comprises deleting the flag.

9. The method of claim 6 further comprising removing files associated with the interruption handling sequence.

10. The method of claim 6, wherein the out of box experience occurs during an initial execution of an operating system.

11. The method of claim 10, wherein the operating system is selected from Windows Vista, Windows XP and Win7.

12. A computer-readable medium having computer-executable instructions for performing a method for managing interruption of an out of box experience for an information handling system (IHS), the method comprising:
    determining whether a flag associated with an interruption to the out of box experience is written to a storage device, wherein the storage device is coupled to a processor within the IHS;
    executing an interruption handling sequence at the processor within the IHS, wherein the processor is operable to read the flag in the storage device as an input to the interruption handling sequence; and executing a replacement of an image of the IHS in response to the flag.

13. The medium of claim 12, wherein the interruption handling sequence comprises deleting the flag.

14. The medium of claim 12, wherein the method further comprises removing files associated with the interruption handling sequence.

15. The method of claim 12, wherein the out of box experience occurs during an initial execution of an operating system.

16. The method of claim 15, wherein the operating system is selected from Windows Vista, Windows XP and Win7.

* * * * *